Feb. 9, 1926.

F. H. BLODGETT 1,572,100

PRUNING DEVICE

Filed August 24, 1923    2 Sheets-Sheet 1

Fred H. Blodgett
INVENTOR

BY Victor J. Evans
ATTORNEY

WITNESS:

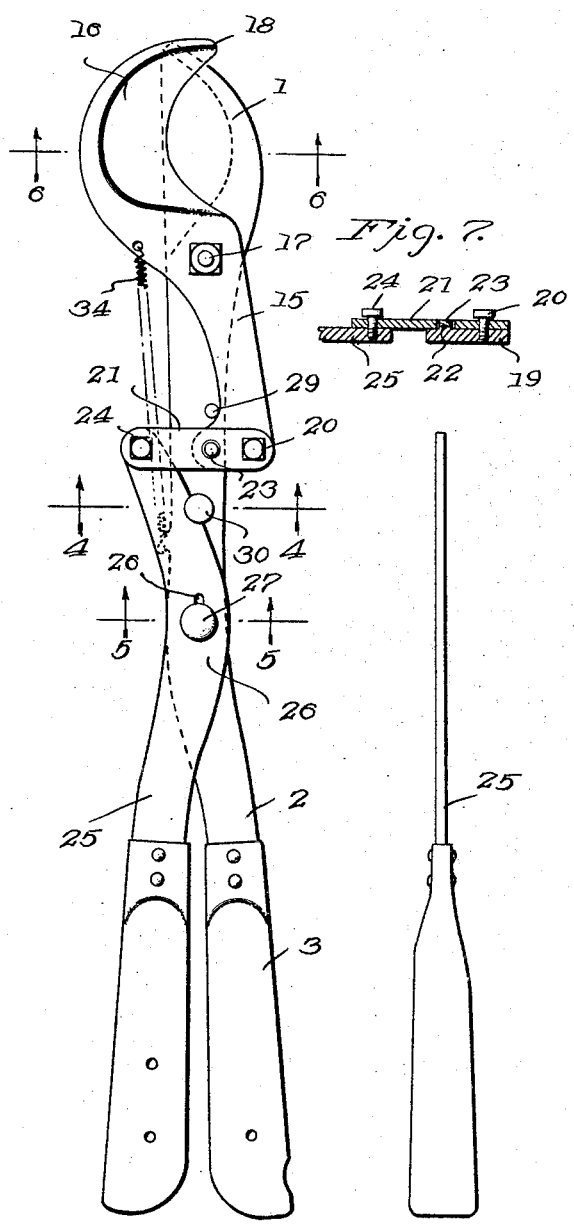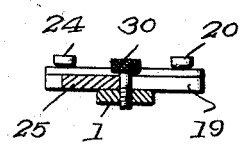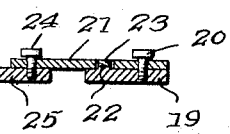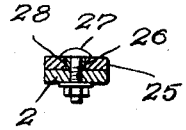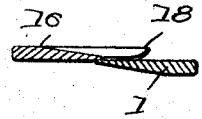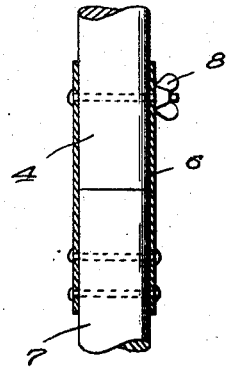

Patented Feb. 9, 1926.

1,572,100

UNITED STATES PATENT OFFICE.

FRED H. BLODGETT, OF WAKEFIELD, MASSACHUSETTS.

PRUNING DEVICE.

Application filed August 24, 1923. Serial No. 659,228.

*To all whom it may concern:*

Be it known that I, FRED H. BLODGETT, a citizen of the United States, residing at Wakefield, in the county of Middlesex and State of Massachusetts, have invented new and useful Improvements in Pruning Devices, of which the following is a specification.

My present invention has reference to a pruning device which may be used as is a pair of shears when the limbs or branches of a tree to be pruned are close to the operator or which may be provided with a sectional pole for arranging the same at varying desired lengths and the movable blade thereof operated by a pull on a cord or cable attached thereto and guided through suitable pulleys on the pole.

A further object is to produce a pruning device in which the movable blade is so constructed as to direct the limb of a tree to be pruned against the stationary blade, and wherein the movable blade is actuated in a manner to insure the free cutting of the device at a minimum physical exertion by the operator.

The foregoing and many other objects which will present themselves as the nature of the invention is better understood, may be accomplished by a construction, combination and operative association of parts such as is disclosed by the drawings which accompany and which form part of this application.

In the drawings:—

Figure 3 is a side elevation of the construction as disclosed in Figure 2, the pole being removed and the operating handle for the movable blade being locked.

Figure 4 is a sectional view on the line 4—4 of Figure 3.

Figure 5 is a sectional view on the line 5—5 of Figure 3.

Figure 6 is a sectional view on the line 6—6 of Figure 3.

Figure 7 is a sectional view on the line 7—7 of Figure 1.

Figure 8 is a detail to illustrate the manner in which the pole sections are removably connected.

Figure 9 is an edge view of the operating handle.

Figure 1:
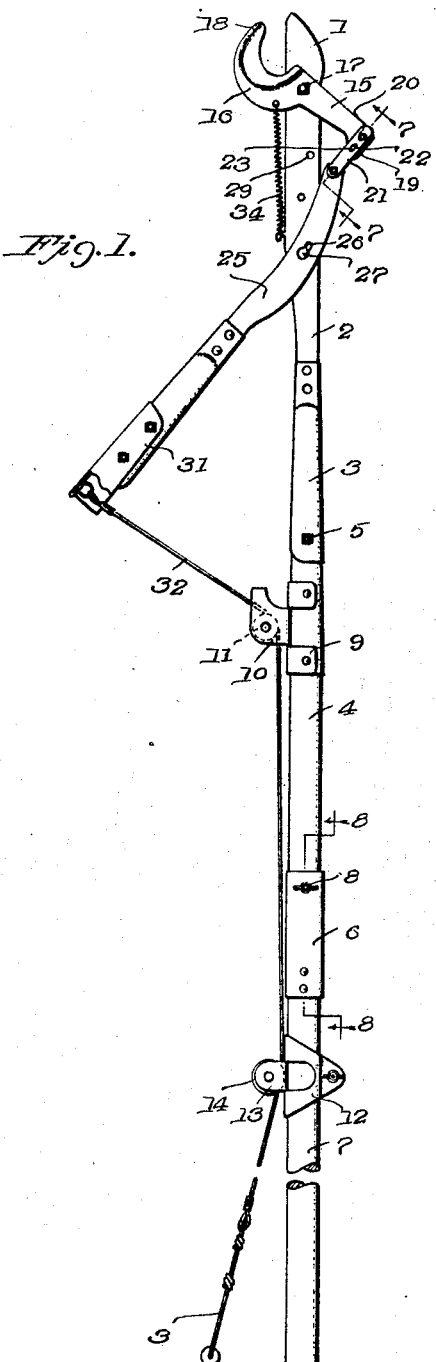
Figure 1 is a side elevation of a pruning device in accordance with this invention, the same being supported on a pole.
Figure 2:
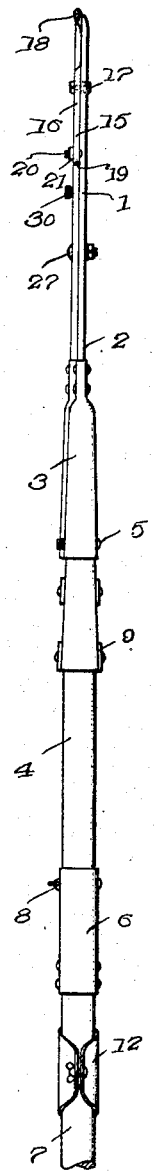
Figure 2 is an edge view thereof with the movable blade swung over the stationary blade.

The stationary blade of my improvement is, in the drawings, indicated by the numeral 1. This blade is formed at one end of a flat shank 2, the said shank having at its end a socket 3 in which is received a ferrule on one end of a pole section 4. Means 5 is passed between the socket and the portion of the pole section 4 received therein for removably locking these parts together. In the showing of Figure 1 of the drawings, the outer end of the pole section 5 is received in a socket 6 formed on or secured to the upper end of a lower pole section 7, and removable means 8 secure the sections 4 and 7 together.

Fixed on the pole section 4 there is a bracket 9, the same centrally carrying a substantially rectangular housing 10 whose outer and lower walls are wholly open and whose top wall is partly open. In this housing there is journaled a grooved wheel 11. Adjustable on the pole section 7 there is secured a clip 12, the said clip having outstanding spaced ears 13 respectively between which is journaled a grooved wheel 14. The grooved wheels carried by the clips and the grooved wheels carried by the bracket are in alignment and any desired number of wheel carrying clips may be arranged upon the several sections of the pole. It is, of course, to be understood that any desired number of pole sections may be employed, and it will be apparent, as the nature of the invention progresses, that the pole sections may be dispensed with when the pruning device is employed as is a pair of shears.

Passing through the shank 2 of the stationary blade and the shank 15 of the movable blade 16 there is a pivot 17. The pivot is preferably in the nature of a bolt having a squared or rectangular end received in a similarly shaped opening in the shank 2 and having a rounded extension that is received through a rounded opening in the shank 15 of the movable blade. The rounded end of the pivot is threaded and has a nut screwed thereon.

The movable blade is elliptical in plan, having its outer face ground to its inner rounded cutting edge and having its outer end or beak arranged at an outward angle with respect to the longitudinal plane of the blade proper. This is an important feature of the invention inasmuch as the beak 18 of the said blade, being arranged against a limb or branch of a tree to be pruned, will direct the said branch against the cutting edge of the stationary blade 1 to afford a shearing cut by the blades. In addition to this, the liability of the pointed end or beak 18 of the movable blade crossing the outer or under face of the stationary blade is entirely overcome.

The shank 15 terminates in an angle end 19, and to this end there is secured by a removable pivot 20 a link 21. Passing through the link to one side of the pivot 20 and through a slightly elongated opening 22 in the angle end of the shank 16 there is a pin 23. The pin permits of a slight swinging of the link on its pivot.

Secured by a removable pivot 24 to the free end of the link 21 there is one end of the operating handle 25. The handle 25 at the portion thereof arranged over the flat inner face of the shank 2 is provided with an arcuate somewhat elongated slot or opening 26. Through this opening there is passed a headed element 27 that has a reduced portion that passes through the shank 2, the said reduced portion being engaged by a suitable nut. On the body of the headed element 27 there is a roller 28 which contacts with the walls provided by the slot or opening 26. This construction permits of a free movement of the operating handle or lever 25 in the swinging thereof, and likewise reduces friction between the pivot 25 and the said operating handle or lever.

To limit the swinging movement of the blade 16 over the blade 1, I arrange on the shank 1 a stop element 29 in the path of contact with one edge of the shank 2. Also when the pruning device is not desired for use and to obviate the liability of the blades inflicting injury to a person conveying the device, I provide the shank 2 with an opening through which may be passed the shank of a headed pin 30, the said pin being arranged against one edge of the operating handle or lever 25 to prevent the swinging of the said lever or handle.

On the outer end of the operating lever or handle there is a socket extension 31 which may be formed with or have integrally formed therewith a loop. The face of the socket on which the loop is formed is open, and the said loop is designed to have attached thereto a cord or cable 33 which is trained over the grooved wheels 11 and 14 when the pole is attached to the shank of the stationary handle. The cord or cable 32 has secured to its lower end a bail 33 which may be readily grasped by one hand of the operator for swinging the operating lever or handle and to cause the movable blade to be moved to cutting position. When the pole is attached and the device is operated by the cord or cable I secure to the movable blade 16 and to one edge of the shank 2 a helical spring 34 which, of course, causes the movable blade to be normally swung away from the stationary blade.

It is believed from the foregoing description, when taken in connection with the drawings that the construction and operation of the improvement as well as the advantages thereof will be perfectly apparent to those skilled in the art to which such inventions relate, but it is to be understood that while I have herein set forth a satisfactory embodiment of the improvement as it now appears to me, I hold myself entitled to make such changes therefrom as fairly fall within the scope of the appended claims.

Having described the invention, I claim:—

1. A pruning shears comprising a flat shank terminating in a blade, an arcuate blade having a shank arranged over and pivotally secured to the first mentioned shank, said blade having its outer end pointed and disposed at an outward angle with respect to the fixed blade, a link pivotally secured to the shank of the movable blade, a pin passing through the link and loosely received in the end of the shank for permitting a limited swinging movement of the link on the shank, an operating handle pivoted to the link and having an arcuate slot, an anti-frictional element on the first mentioned shank and passing through said slot, means limiting the swinging of the fixed blade with respect to the stationary blade, and spring means influencing the movable blade to open position.

2. A pruning shears comprising a flat shank terminating in a blade at one end and having a socket at its other end, an arcuate blade disposed over the fixed blade having a pointed end arranged at an outward angle with respect to the fixed blade, a shank for the arcuate blade overlying and pivotally secured to the first mentioned shank, a link pivoted to the outer end of the last mentioned shank and susceptible to a limited swinging thereon, an operating handle pivoted to the link and having an arcuate slot therethrough, an anti-frictional roller on the first mentioned shank received through said slot, spring means between the movable blade and the first mentioned shank for influencing the blade to open position, means limiting the swinging of the blade to closed position, and a removable means for preventing the swinging of said blade.

In testimony whereof I affix my signature.

FRED H. BLODGETT.